United States Patent Office 3,835,001
Patented Sept. 10, 1974

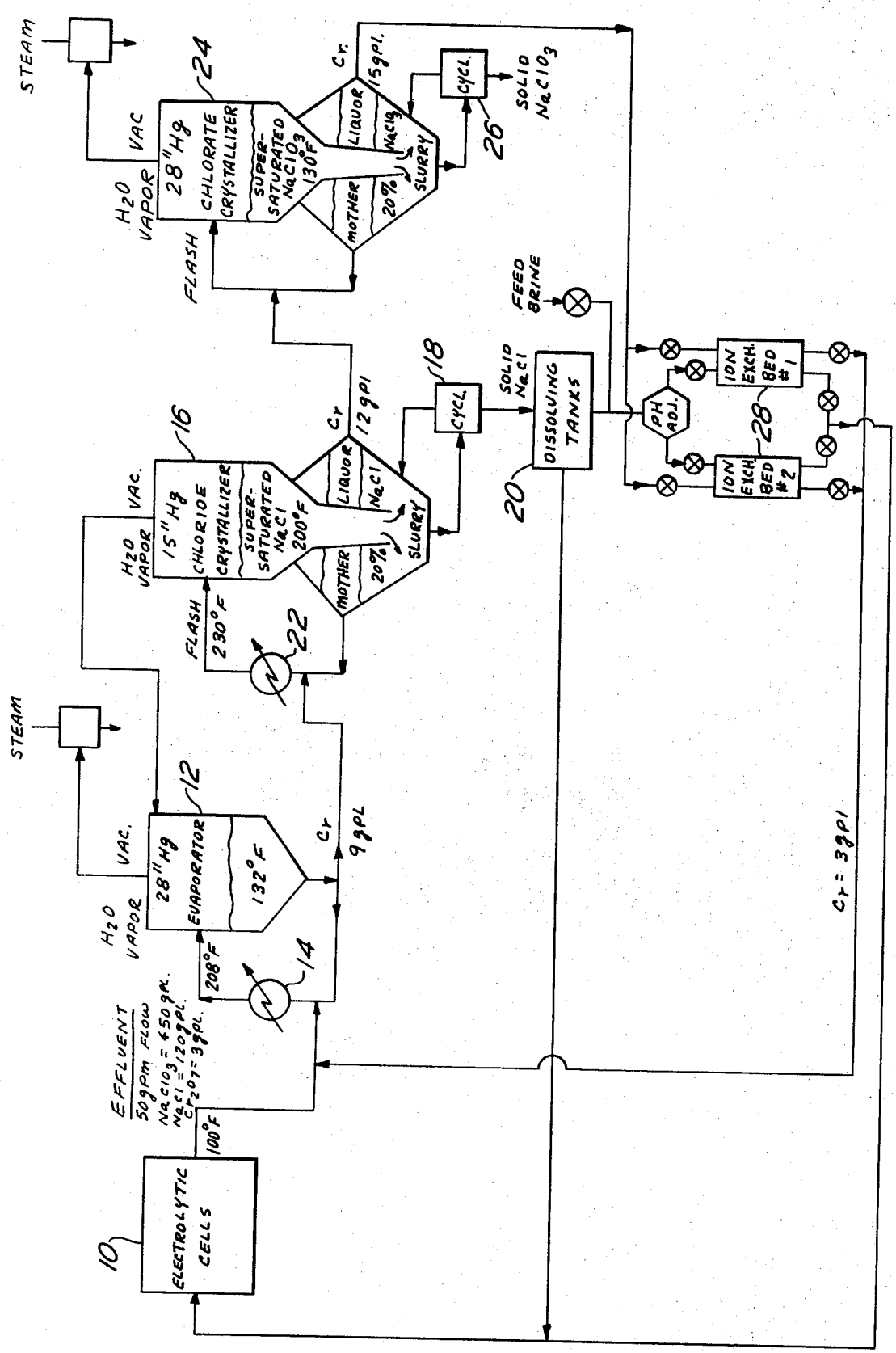

3,835,001
ION EXCHANGE REMOVAL OF DICHROMATES FROM ELECTROLYTICALLY PRODUCED ALKALI METAL CHLORATE-CHLORIDE SOLUTIONS
Thomas Francis O'Brien, Swarthmore, Pa., assignor to Penn-Olin Chemical Company, Wilmington, Del.
Filed Apr. 30, 1973, Ser. No. 355,370
Int. Cl. C01b 11/26
U.S. Cl. 204—95
6 Claims

ABSTRACT OF THE DISCLOSURE

In an electrolytic process in which alkali metal chlorate is produced from alkali metal chloride solution, dichromates (utilized for cathodic protection during electrolysis) are removed from an effluent stream of chlorate-enriched solution by passing the stream through an ion exchange resin to effect an improvement in process efficiency. When the ion exchange resin becomes exhausted the bed is regenerated with high pH sodium chloride brine. The ion exchange system is especially adapted to remove dichromates from the recycle stream of the evaporatively concentrated alkali metal chlorate solution whereby the recycle stream can be combined with the electrolytic process effluent for evaporative concentration.

---

This invention relates to an electrolytic process for producing alkali metal chlorates, and more particularly relates to the removal of chromates from chlorate-rich streams especially recycle streams and then recovering said chromates for return to the electrolytic process in a chloride-rich stream without introduction of any foreign matter into the process.

In the electrolytic process for making alkali metal chlorates, small proportions of chromium in the form of chromates or dichromates are added to the electrolyte in order to protect the cathodes in the cells. However, accumulation of the chromium ion, either as $Cr_2O_7^=$ or $CrO_4^=$, in the solutions being evaporatively concentrated for recovery of the alkali metal chlorate can affect the color of the chlorate product or unfavorably influence the processing sequence. Furthermore, since much of the chlorate produced is used directly in solution form without removal of the chromium, this chromium could end up in the effluent of such plants and contaminate the rivers and streams. An example of use of the chlorate in solution form is in chlorine dioxide generation at pulp mills. Moreover, during normal commercial production of alkali metal chlorates, most of the chromium is usually recovered in the liquor from a chlorate crystallizer for subsequent recycling back to the electrolytic cells. Where these electrolytic cells are operated by flowing the liquor in series therethrough, it would be advantageous to add this recycle stream to a point other than the fresh feed position. That is, it would be more desirable to add the recycle stream to a point at which the cell concentrations or ratios of chlorate to chloride most nearly coincide with the recycle concentration. In the normal case, such would not be feasible because of the necessity to maintain a substantial concentration of chromate in the cells to act as a depolarizer preventing reduction at the cathodes. Finally, loss of the chromium must also be considered because of the attendant costs in replenishment.

One way to produce a chromate-free solution has been to recover the chlorate as a solid crystal and wash off the occluded liquor containing chromium. However, the compared to the direct use of the chlorate solution form is considerable.

Another method employed in the past has been to precipitate the chromate ion by adding a suitable cation to the solution. For example, a reagent such as a soluble barium salt ($BaCl_2$) has been employed to precipitate out barium chromate followed by the addition of an alkali metal carbonate ($Na_2CO_3$) to precipitate any excess barium. However, in the latter circumstances, a separate filtration step is required, and the more common "insoluble" chromates suffer appreciable solubility in strong chlorate solutions. While precipitation in theory could offer a solution, the efficacy is limited because of the contamination introduced by the reagents and the cost is expensive.

It is therefore an object of this invention to provide a new and improved method for removal of dichromates from chlorate-enriched alkali metal chlorate-chloride solutions produced by electrolysis.

Another object of this invention is to provide a method for removal of dichromates from a recycle stream of chlorate-enriched solutions effected by evaporative concentration of electrolytically produced alkali metal chlorate.

Still another object of this invention is to provide a method of removal of dichromates from chlorate-enriched solutions produced by electrolysis of brine which will permit recycling of the chlorate-enriched alkali metal chlorate-chloride stream back for evaporative concentration along with the electrolytically produced effluent.

Yet a further object of this invention is to provide a method for recovering dichromate from chlorate-enriched, electrolytically-produced alkali metal chlorate-chloride solutions without introduction of any foreign matter into the process.

Yet still a further object of this invention is to provide a method for recovering dichromates from chlorate enriched solutions produced by electrolysis which will permit recycling of the chloride-enriched stream to any point of the process.

Other objects of this invention are to provide an improved method of the character described which is easily and economically produced and highly efficient and effective in operation.

With the above and related objects in view, this invention consists of the details of operation and combination of functions as will be more fully understood from the following detailed description when read in conjunction with the accompanying drawing in which the figure is a flow diagram illustrative of the present invention.

The present invention contemplates the removal of chromium from chlorate-rich streams of electrolytically produced alkali metal chlorate-chloride solutions. In the instant system, dichromate ions are selectively removed from solutions of alkali metal chlorate and alkali metal chloride by a strongly basic ion exchange resin in chloride form. This removal is accomplished at low pH. At high pH, dichromate is converted into chromate by the reaction:

$$Cr_2O_7^= + 2OH^- \rightarrow 2CrO_4^= + H_2O$$

Chromate ions are less tightly held by the ion exchange resin so that by contacting the dichromate loaded resin with a chloride solution at high pH, the chromate may be effectively and rapidly removed. Thus, the regeneration of the dichromate saturated resin can be accomplished by passing alkaline sodium chloride solution through the ion exchange bed. Prior to the present conception, it would have not been deemed reasonably likely to be able to remove dichromates from chloride-containing solutions by the use of ion exchange resin in chloride form with any appreciable efficiency because of the probability that the chloride ion in the stream would prevent the accessibility of the ion exchange resin from selectively holding the dichromate ion at the site.

The following examples are illustrative of the functionality of the instant invention.

EXAMPLE 1

Six liters of a solution containing approximately 500 grams per liter sodium chlorate, 100 g.p.l. sodium chloride and 1.75 g.p.l. sodium dichromate were prepared as a representative feed solution. The pH of the solution was adjusted to pH 5 by adding an appropriate amount of HCl. This feed was analyzed at 496 g.p.l. $NaClO_3$, 96 g.p.l. NaCl and 1.74 g.p.l. $Na_2Cr_2O_7$. An ion exchange bed was made by packing 200 grams of IRA-400 resin (a strongly basic quaternary resin, 20 to 50 mesh, of the general formula $RN(CH_3)_3{}^+Cl^-$, made by Rohm and Haas Company, of Philadelphia, Pa.) into a one inch diameter glass pipe about two feet long. The height of the packed resin was approximately 20 inches. The feed solution was fed to the top of the glass column from a dropping funnel and metered from the bottom by a pinchclamp. The flow through the column was maintained at 20 ml. per minute or about 1 g.p.m./ft.$^2$. 50 ml. samples were taken periodically and checked for pH and chromate concentration, the latter being determined by way of a standard thiosulfate titration. Initial portions of the effluent from the column were also analyzed for sodium chlorate and sodium chloride concentration to determine what if any of the chlorate or chloride would be picked up by the ion exchange bed. The results of the exchange cycle are shown in Table I below:

TABLE I

| Sample number | Total vol. (ml.) | pH | $Na_2Cr_2O_7$ (g.p.l.) | $NaClO_3$ (g.p.l.) | NaCl (g.p.l.) |
|---|---|---|---|---|---|
| 1 | 50 | 8.7 | 0.12 | 0 | 61.3 |
| 2 | 300 | 7.9 | .39 | 396 | 102.9 |
| 3 | 550 | 7.3 | .34 | 458 | 105.2 |
| 4 | 800 | 6.9 | .35 | | |
| 5 | 1,050 | 6.3 | .33 | | |
| 7 | 1,550 | 6.0 | .37 | | |
| 10 | 2,300 | 5.6 | .41 | | |
| 15 | 3,550 | 5.4 | .56 | | |
| 18 | 4,300 | 5.2 | .72 | | |
| 21 | 5,050 | 5.0 | .88 | | |

As is apparent, the initial product contained about 0.3 to 0.4 g.p.l. $Na_2Cr_2O_7$, but after five liters of solution had passed through the bed, only about half of the chromate was being removed. It is to be observed that at the beginning of the exchange cycle, some chlorate was also picked up by the resin. This was a small percentage of total flow, since after 300 ml. had passed the $NaClO_3$ concentration was approximately 400 g.p.l. and after 550 ml. had passed the chlorate concentration was over 450 g.p.l.

The bed was then rinsed with 200 ml. of demineralized water preparatory to affecting regeneration. Regeneration was performed by passing sodium chloride brine (100 g.p.l. NaCl) adjusted to pH 12 (using sodium hydroxide) through the bed in the same direction of flow as during exchange and also at a rate of 20 ml. per min. The effluent was again sampled in sizes of about 50 ml. with volume between samples of about 200 ml. The results of the regeneration cycle are tabulated in Table IA below.

TABLE IA

| Sample number | Total vol. (ml.) | pH | Chromate (g.p.l.) (as $Na_2Cr_2O_7$) |
|---|---|---|---|
| 2 | 300 | 7.1 | 4.31 |
| 3 | 550 | 6.9 | 4.34 |
| 4 | 800 | 7.3 | 4.39 |
| 5 | 1,050 | 11.0 | 3.75 |
| 7 | 1,550 | 11.6 | 2.15 |
| 9 | 2,050 | 11.7 | 0.87 |
| 11 | 2,550 | 11.7 | 0.31 |
| 14 | 3,300 | 11.8 | 0 |

As may be seen, the effluent initially contained about 4.3 g.p.l. $Na_2Cr_2O_7$ equivalent, more than twice the concentration in the original feed. Note that the chromate concentration began to fall off after 800 ml. had been passed. Furthermore, no chromate was detected after 3.3 liters of brine was passed through during regeneration.

EXAMPLE 2

Six liters of a solution containing 7.72 g.p.l. $Na_2Cr_2O_7$ along with approximately 500 g.p.l. $NaClO_3$ and 100 g.p.l. NaCl at pH 4.1 was passed through the one inch glass tube containing 175 g.m.s. and IRA-400 resin in a manner similar to Example I. Samples of 25 ml. of effluent were collected about every 200 ml. The results of the ion exchange cycle are shown in Table II below.

TABLE II

| Sample number | Total vol. (ml.) | pH | Chromate (g.p.l.) |
|---|---|---|---|
| Feed | | 4.1 | 7.72 |
| 2 | 250 | 8 | 0.97 |
| 3 | 475 | 6.8 | .60 |
| 4 | 700 | 5.6 | .58 |
| 5 | 925 | 5.4 | .66 |
| 6 | 1,150 | 5.3 | .68 |
| 7 | 1,375 | 5.2 | .85 |
| 8 | 1,600 | 5.0 | 1.10 |
| 10 | 2,050 | 4.6 | 1.85 |
| 13 | 2,725 | 4.6 | 2.78 |
| 15 | 3,175 | 4.3 | 3.93 |
| 18 | 3,850 | | 5.75 |
| 20 | 4,300 | 4.1 | 6.36 |
| 23 | 4,975 | | 7.09 |
| 25 | 5,425 | 4.0 | 7.39 |

It is to be observed that the initial chromate concentration in the effluent was about 0.6 g.p.l. However, after passing about 5.5 liters of feed solution through, the chromate concentration in the effluent was about 7.4 g.p.l., indicating nearly complete dissipation of the resin. Graphical integration of the data on breakthrough indicated about 50 percent replacement of chloride.

Regeneration was performed as in Example 1, and the results of the effluent analysis during the regeneration cycle is shown in Table IIA below.

TABLE IIA

| Sample number | Total vol. (ml.) | pH | Chromate (g.p.l.) |
|---|---|---|---|
| 1 | 25 | 5.8 | 8.52 |
| 2 | 250 | 6.4 | 8.33 |
| 3 | 475 | 6.4 | 8.09 |
| 5 | 925 | 6.4 | 8.09 |
| 8 | 1,600 | | 7.48 |
| 10 | 2,050 | 7.8 | 7.17 |
| 11 | 2,275 | 11.5 | 5.45 |
| 12 | 2,500 | 11.7 | 3.91 |
| 13 | 2,725 | 11.8 | 3.41 |
| 14 | 2,963 | 11.8 | 2.59 |
| 15 | 3,188 | 11.8 | 1.97 |
| 18 | 3,863 | | 0.19 |
| 20 | 4,313 | 12.0 | 0.42 |

As is readily apparent, the initial effluent contained about 8.5 g.p.l. $Na_2Cr_2O_7$ and after 4.3 liters of brine had passed, removal of chromium was generally complete.

Referring now in greater detail to the flow diagram in which similar reference characters refer to similar parts. There is shown a typical electrolytic alkali metal chlorate process. Electrolysis of an aqueous solution of sodium chloride is performed in electrolytic cells 10 which may be operated in series, parallel or in cascade. The electrolysis is normally conducted commercially in diaphragmless electrolytic cells wherein chlorine is produced at the anode while hydroxyl ions are produced at the cathode, and these react to yield hypochlorite which converts rapidly to sodium chlorate. Chromium in the form of sodium dichromate is added to the feed to the cell at a concentration of about 3 g.p.l. in order to prevent reduction of the cathode. The typical cell effluent with graphite electrodes exists at 100° F. and contains 450 grams per liter of sodium chlorate, 120 grams per liter sodium chloride and 3 grams per liter of sodium chromate. Since the electrolytic production of alkali metal chlorate requires a certain minimum quantity of alkali metal chloride, chloride is periodically replenished by adding in the form of a feed brine.

The effluent from the cells is then passed to an evaporator 12 operating at approximately 28 inches of mercury whereby the chlorate-chloride solution is concentrated and becomes saturated with respect to the alkali metal chloride. Heat exchanger 14 raises the effluent temperature to about 200° F. before delivery to the evaporator 12. A portion of the concentrated solution from the evaporator 12 is recycled back while the remainder is passed through a heat exchanger 22 to bring the temperature up to approximately 230° F. for delivery to a crystallizer 16. The dichromate level out of the evaporator is about 9 grams per liter.

The concentrated aqueous solution is thus flash evaporated in the chloride crystallizer 16 operating at about 15 inches of mercury whereupon the solution becomes supersaturated with respect to alkali metal chloride. The supersaturated solution upon coming into contact with a 20 percent by weight seed slurry of sodium chloride causes sodium chloride to crystallize out, and the effluent from the seed slurry is passed to a cyclone or centrifuge 18 which separates out solid sodium chloride. The liquid component of the cyclone 18 is returned to the seed slurry at the bottom of the crystallizer 16. Mother liquor in the crystallizer 16 is recycled back for flash evaporation along with the cell effluent. The solid sodium chloride is re-dissolved in tanks 20 for use as feed to the cells.

Effluent from the sodium chloride crystallization 16 having a sodium dichromate level about 12 grams per liter is then flash evaporated into chlorate crystallizer 24 operating at about 28 inches of mercury. Supersaturated sodium chlorate solution at about 130° F. falls into a 20 percent by weight sodium chlorate feed slurry at the bottom of crystallizer 24 to crystallize out sodium chlorate is recovered by cyclone or centrifuge 26 and the liquid returned to the chlorate slurry. A portion of the chlorate mother liquor is recycled back to the upper portion of the crystallizer 24 along with the effluent from the chloride crystallizer 16 for flash evaporation. The effluent from the chlorate crystallizer 24 has a sodium dichromate concentration of about 15 grams per liter, a sodium chlorate concentration of about 625 grams per liter and a sodium chloride concentration of about 100 grams per liter. If this effluent from the chlorate crystallizer were recycled directly back to the evaporator 12 together with the electrolytic cell effluent, it is easily seen that the sodium dichromate concentration would constantly build up through the evaporative concentration process through evaporator 12, salt crystallizer 16 and chlorate crystallizer 24. Build-up of chromium concentration would ultimately result in an impure product. However, removal of sodium dichromate by ion exhange prevents build-up of appreciable concentrations. This allows greater water removal from the crystallizer during each pass thereby promoting crystallizer efficiency.

Therefore, the effluent from crystallizer 24 is passed through one of a pair of ion exchange beds 28 wherein the dichromate is retained on the strongly basic quarternary ammonium chloride ion resin while the chlorate-chloride solution is returned for evaporative concentration to the evaporator 12 along with the electrolytic cell effluent. When the first ion exchange bed 28 becomes saturated with dichromate ion, it is cut off, and bed #2 is placed into operation. The concentrated sodium chloride solution in dissolving tank 20 is now adjusted to high pH with caustic soda, for example, and passed through ion exchange bed #1 to convert the dichromate ion therein to chromate ion. The chromate is thereby released from the exchange resin and returned to the cell feed after the pH is adjusted to about 6 with chlorine or hydrochloric acid. The procedure is alternately performed with ion exchange beds #1 and #2.

As is apparent from the foregoing, the chromium level cannot build up during the evaporative concentration process and an excellent material balance is achieved by recycling the effluent from the chlorate-crystallizer back to the evaporator. At the same time, an efficient utilization of the ion exchange resin is accomplished since the sodium dichromate concentration at this point is relatively high.

However, it is also to be observed that the dichromate can be removed by the use of the ion exchange system at any portion of the flow, for example in the electrolytic cell effluent. In the latter instance, of course, a larger ion exchange bed would be required because of the flow rate and relatively low chromate concentration at this point with attendant increased costs of expensive ion exchange resin.

Although this invention has been described in considerable detail, such description is intended as being illustrative rather than limiting, since the invention may be variously embodied without departing from the spirit thereof, and the scope of the invention is to be determined as claimed.

What is claimed is:

1. In an electrolytic chlorate process in which alkali metal chlorate is recovered from a chlorate-enriched, alkali metal chlorate-alkali metal chloride solution, the steps of
    (a) treating an alkali metal chloride brine solution with sufficient alkali metal salt of chromic acid to inhibit cathodic reduction during electroylsis,
    (b) electrolyzing the chromium ion-containing, alkali metal chloride, brine solution so that a portion thereof is converted into alkali metal chlorate,
    (c) while maintaining the pH of the chromium ion containing alkali metal chlorate-alkali metal chloride solution below at least 6.5 passing the acidic solution through a bed of insoluble quaternary ammonium anion exchange resin in chloride ion form thereby removing the chromium in dichromate form from solution by selective exchange with the chloride ion of said exchange resin, and
    (d) recovering the alkali metal chlorate from the alkali metal chloride.

2. The process of claim 1 wherein said ion exchange resin after becoming exhausted is regenerated by passing alkali metal chloride brine at high pH therethrough to convert the dichromate ion to chromate ion whereby the latter is released for recovery and returned to the electrolytic process.

3. The process of claim 2 wherein the effluent from the ion exchange bed being regenerated is acidified to a pH in the range of about 4 to 6 prior to return to the electrolytic process.

4. The process of claim 3 wherein the means for acidifying is selected from the group consisting of hydrochloric acid and chlorine.

5. The process of claim 2 wherein a pair of parallel ion exchange resin beds are employed, one operative to remove dichromate ion from the stream while the other is being regenerated.

6. The process of claim 1 wherein the ion exchange bed is incorporated in an effluent stream from a crystallizer in which a high chlorate-to-chloride ratio exists and a portion of said effluent stream is returned as a recycle stream to an earlier portion of the process.

References Cited

UNITED STATES PATENTS

| | | | |
|---|---|---|---|
| 3,406,008 | 10/1968 | Carlin | 423—54 |
| 3,799,849 | 3/1974 | Cook et al. | 204—95 |
| 3,664,950 | 5/1972 | Saraceno et al. | 423—54 |
| 3,306,859 | 2/1967 | Sloan et al. | 423—54 |
| 2,628,935 | 2/1953 | Earnest et al. | 204—95 |
| 2,641,543 | 6/1953 | Unger et al. | 210—37 |
| 2,697,079 | 12/1954 | D'Alelio | 210—37 |
| 3,427,236 | 2/1969 | Scholander et al. | 204—95 |

JOHN H. MACK, Primary Examiner

W. A. LANGEL, Assistant Examiner

U.S. Cl. X.R.

423—54

UNITED STATES PATENT OFFICE
CERTIFICATE OF CORRECTION

Patent No. 3,835,001  Dated  September 10, 1974

Inventor(s)  Thomas Francis O'Brien

It is certified that error appears in the above-identified patent and that said Letters Patent are hereby corrected as shown below:

Column 1, line 65, after "the", second occurrence, insert -- additional expense of the crystallization and washing compound --. Column 5, line 27, after "chlorate", insert -- . Where solid sodium chlorate product is desired, the solid sodium chlorate --. Column 6, line 29, Claim 1, after "chromium" and before "in", insert -- ion --.

Signed and sealed this 31st day of December 1974.

(SEAL)
Attest:

McCOY M. GIBSON JR.
Attesting Officer

C. MARSHALL DANN
Commissioner of Patents